(12) United States Patent
Seagren et al.

(10) Patent No.: US 12,009,772 B2
(45) Date of Patent: Jun. 11, 2024

(54) PARALLEL EXCITATION OF MOTOR START FUNCTION FOR THREE STAGE SYNCHRONOUS GENERATOR

(71) Applicant: Hamilton Sundstrand Corporation, Charlotte, NC (US)

(72) Inventors: Robert L. Seagren, Rockford, IL (US); Kyle Stephen Ives, Loves Park, IL (US); Michael C. Harke, DeForest, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 29 days.

(21) Appl. No.: 17/543,785

(22) Filed: Dec. 7, 2021

(65) Prior Publication Data
US 2023/0179130 A1 Jun. 8, 2023

(51) Int. Cl.
*H02P 9/08* (2006.01)
*H02P 9/04* (2006.01)
*H02P 101/30* (2015.01)

(52) U.S. Cl.
CPC ............... *H02P 9/08* (2013.01); *H02P 9/04* (2013.01); *H02P 2101/30* (2015.01)

(58) Field of Classification Search
CPC ........... H02P 9/04; H02P 9/08; H02P 2101/30
See application file for complete search history.

(56) References Cited

U.S. PATENT DOCUMENTS

| | | | | |
|---|---|---|---|---|
| 5,194,801 A | * | 3/1993 | Rozman | H02P 9/102 |
| | | | | 322/25 |
| 5,581,168 A | * | 12/1996 | Rozman | F02N 11/04 |
| | | | | 290/22 |
| 5,594,322 A | * | 1/1997 | Rozman | H02P 9/08 |
| | | | | 322/29 |
| 6,031,294 A | | 2/2000 | Geis et al. | |

(Continued)

FOREIGN PATENT DOCUMENTS

EP 3296212 A1 3/2018

OTHER PUBLICATIONS

European Search Report for Application No. 22210019.0, dated Apr. 18, 2023, 11 pages.

*Primary Examiner* — Tulsidas C Patel
*Assistant Examiner* — Thomas K Quigley
(74) *Attorney, Agent, or Firm* — CANTOR COLBURN LLP

(57) ABSTRACT

Systems for parallel excitation for a synchronous machine are provided. Aspects include a rectification circuit coupled to an output of a permanent magnet generator, and an excitation winding connected to an output of the rectification circuit, a direct current (DC) power source connected between an output of the rectification circuit and the excitation winding, wherein the excitation winding supplies an excitation voltage to an excitation armature in a main generator during a during a plurality of operational modes, wherein the plurality of operational modes comprise a startup mode and a generator mode, wherein a DC excitation (Continued)

voltage is provided to the excitation windings by the DC power source during the startup mode, and wherein the DC excitation voltage is provided to the excitation windings by the rectification circuit during the generator mode.

20 Claims, 3 Drawing Sheets

(56) References Cited

U.S. PATENT DOCUMENTS

| | | | | |
|---|---|---|---|---|
| 6,707,205 | B2* | 3/2004 | Johnsen | H02K 19/38 |
| | | | | 310/112 |
| 6,850,043 | B1* | 2/2005 | Maddali | H02H 7/065 |
| | | | | 322/28 |
| 7,208,854 | B1* | 4/2007 | Saban | H02K 9/19 |
| | | | | 310/52 |
| 7,268,522 | B1* | 9/2007 | Baker | H02K 19/26 |
| | | | | 290/31 |
| 7,479,746 | B2* | 1/2009 | Rozman | F02N 11/04 |
| | | | | 318/98 |
| 7,687,929 | B2* | 3/2010 | Fattal | H02P 9/04 |
| | | | | 290/40 C |
| 7,821,145 | B2* | 10/2010 | Huang | F02N 11/04 |
| | | | | 322/17 |
| 8,378,641 | B2* | 2/2013 | Rozman | H02M 1/36 |
| | | | | 322/59 |
| 8,378,644 | B2* | 2/2013 | Said | H02P 9/302 |
| | | | | 322/44 |
| 8,432,137 | B2* | 4/2013 | Rozman | H02P 9/34 |
| | | | | 310/190 |
| 8,823,334 | B2* | 9/2014 | Huang | H02P 6/20 |
| | | | | 322/29 |
| 8,866,449 | B1* | 10/2014 | Rozman | H02P 6/183 |
| | | | | 322/46 |
| 9,252,695 | B2* | 2/2016 | Benya, Jr. | H02P 9/10 |
| 9,257,889 | B2* | 2/2016 | Rozman | H02P 9/305 |
| 9,543,876 | B2* | 1/2017 | Patel | H02K 19/28 |
| 9,660,563 | B2* | 5/2017 | Rozman | H02P 9/305 |
| 9,998,047 | B2* | 6/2018 | Rozman | H02K 11/33 |
| 10,256,758 | B2* | 4/2019 | Frampton | H02P 9/04 |
| 10,415,530 | B2 | 9/2019 | Liu et al. | |
| 11,329,539 | B2* | 5/2022 | Vandergrift | H02K 19/36 |
| 2002/0047455 | A1* | 4/2002 | Dhyanchand | F02N 11/04 |
| | | | | 310/211 |
| 2004/0108726 | A1* | 6/2004 | Sarlioglu | F02N 11/0859 |
| | | | | 290/38 R |
| 2007/0108854 | A1* | 5/2007 | Osborn | H02K 11/042 |
| | | | | 363/145 |
| 2007/0216343 | A1* | 9/2007 | Rozman | H02P 21/06 |
| | | | | 318/811 |
| 2007/0268004 | A1* | 11/2007 | Rozman | H02P 9/307 |
| | | | | 322/37 |
| 2008/0231144 | A1 | 9/2008 | Grant et al. | |
| 2009/0251112 | A1* | 10/2009 | Gieras | H02K 3/493 |
| | | | | 310/156.32 |
| 2010/0034003 | A1* | 2/2010 | Rozman | H02M 7/066 |
| | | | | 363/171 |
| 2010/0308582 | A1* | 12/2010 | Rozman | H02P 9/102 |
| | | | | 290/31 |
| 2012/0007428 | A1* | 1/2012 | Rozman | H02M 1/15 |
| | | | | 307/66 |
| 2012/0091939 | A1* | 4/2012 | Rozman | H02K 3/28 |
| | | | | 310/152 |
| 2013/0221794 | A1* | 8/2013 | Ponnampalam | H02K 3/38 |
| | | | | 72/55 |
| 2014/0265693 | A1* | 9/2014 | Gieras | H02P 9/302 |
| | | | | 310/154.02 |
| 2014/0285053 | A1* | 9/2014 | Himmelmann | H02K 21/042 |
| | | | | 310/181 |
| 2015/0263658 | A1* | 9/2015 | Benya, Jr. | H02P 9/302 |
| | | | | 322/46 |
| 2018/0026568 | A1 | 1/2018 | Huang | |

* cited by examiner

PARALLEL EXCITATION OF MOTOR START FUNCTION FOR THREE STAGE SYNCHRONOUS GENERATOR

BACKGROUND

The present invention generally relates to synchronous generators, and more specifically, to the parallel excitation of a motor start function for a three-stage synchronous generator.

Generators convert mechanical energy to electrical energy via the interaction of rotating magnetic fields and coils of wire. Conversely, motors convert electrical energy to mechanical energy via the interaction of magnetic fields. An electric machine may therefore operate as either a generator or a motor depending on the direction of power flow (e.g., mechanical to electrical or electrical to mechanical). A multitude of electric machine architectures have been developed with various means of providing interaction between magnetic fields and coils of wire. For example, a permanent magnet machine (PMM), operating in a generating mode, utilizes permanent magnets to generate a constant magnetic field, which is rotated via the mechanical energy supplied by a prime mover such that the rotating magnetic field interacts with the stator coils to provide an output voltage.

Another type of electric machine, again operating in a generating mode, supplies current through a coil to generate the desired magnetic field on the rotor, which is rotated via the mechanical energy supplied by a prime mover, such that a rotating magnetic field is created that interacts with the stationary stator coils to provide an output voltage.

In the former example, a smaller Permanent Magnet Generator (PMG) rotating on a common shaft is typically used to create the electric power necessary to power the exciter coil. The output voltage supplied by the PMG depends only on the speed of the prime mover. In the latter example, the output voltage of the generator can be regulated by varying the current supplied to the exciter coil. For applications in which the output voltage must be regulated, the latter example, known as a wound field synchronous machine, is widely utilized.

The regulation of the wound field synchronous machine depends on an excitation voltage provided to the generator from a control circuitry. This excitation voltage is provided sufficiently when the PMG is operating with the prime mover rotating at an operation speed sufficient to create a power output to the control circuitry. However, when the prime mover is not moving or moving at a low speed, the excitation voltage may not be sufficient for certain applications.

BRIEF DESCRIPTION

Embodiments of the present invention are directed to a system. A non-limiting example of the system includes a main generator connected to a motor, a permanent magnet generator connected to a generator controller, wherein the permanent magnet generator is mechanically connected to a prime mover, wherein the generator controller includes a rectification circuit coupled to an output of the permanent magnet generator, and an excitation winding connected to output of the rectification circuit, a direct current (DC) power source connected between an output of the rectification circuit and an input of the excitation winding, wherein the generator controller is configured to supply a DC excitation voltage to the excitation winding to regulate the main generator during a plurality of operational modes, wherein the plurality of operational modes comprise a startup mode and a generator mode, wherein the DC excitation voltage is provided to the excitation windings by the DC power source during the startup mode, and wherein the DC excitation voltage is provided to the excitation windings by the rectification circuit during the generator mode.

In addition to one or more of the features described above, or as an alternative, further embodiments of the system may include that during the startup mode, the prime mover is rotating below a threshold rotational speed.

In addition to one or more of the features described above, or as an alternative, further embodiments of the system may include that during the generator mode, the prime mover is rotating above a threshold rotational speed.

In addition to one or more of the features described above, or as an alternative, further embodiments of the system may include that the main generator includes an excitation armature connected to a second rectification circuit, a main field winding connected to an output of the second rectification circuit, and main generator windings.

In addition to one or more of the features described above, or as an alternative, further embodiments of the system may include that the generator controller further comprises a set of switches comprising a first switch and a second switch.

In addition to one or more of the features described above, or as an alternative, further embodiments of the system may include that the generator controller further comprises a DC link capacitor connected in parallel at the output of the rectification circuit.

In addition to one or more of the features described above, or as an alternative, further embodiments of the system may include that the motor comprises a synchronous machine.

In addition to one or more of the features described above, or as an alternative, further embodiments of the system may include that the generator controller further comprises a boost converter connected to the DC power source.

In addition to one or more of the features described above, or as an alternative, further embodiments of the system may include that the DC power source comprises a rechargeable battery.

In addition to one or more of the features described above, or as an alternative, further embodiments of the system may include that the rechargeable battery is charged by the permanent magnet generator while in generator mode.

Embodiments of the present invention are directed to a system. A non-limiting example of the system includes a rectification circuit coupled to an output of a permanent magnet generator, and an excitation winding connected to an output of the rectification circuit, a direct current (DC) power source connected between an output of the rectification circuit and the excitation winding, wherein the excitation winding supplies an excitation voltage to an excitation armature in a main generator during a during a plurality of operational modes, wherein the plurality of operational modes comprise a startup mode and a generator mode, wherein a DC excitation voltage is provided to the excitation windings by the DC power source during the startup mode, and wherein the DC excitation voltage is provided to the excitation windings by the rectification circuit during the generator mode.

In addition to one or more of the features described above, or as an alternative, further embodiments of the system may include that the permanent magnet generator is connected to a prime mover.

In addition to one or more of the features described above, or as an alternative, further embodiments of the system may include that during the startup mode, the prime mover is rotating below a threshold rotational speed.

In addition to one or more of the features described above, or as an alternative, further embodiments of the system may include that during the generator mode, the prime mover is rotating above a threshold rotational speed.

In addition to one or more of the features described above, or as an alternative, further embodiments of the system may include that the generator controller further comprises a set of switches comprising a first switch and a second switch.

In addition to one or more of the features described above, or as an alternative, further embodiments of the system may include that the generator controller further comprises a DC link capacitor connected in parallel at the output of the rectification circuit.

In addition to one or more of the features described above, or as an alternative, further embodiments of the system may include that the motor comprises a synchronous machine.

In addition to one or more of the features described above, or as an alternative, further embodiments of the system may include that the generator controller further comprises a boost converter connected to the DC power source.

In addition to one or more of the features described above, or as an alternative, further embodiments of the system may include that the DC power source comprises a rechargeable battery.

In addition to one or more of the features described above, or as an alternative, further embodiments of the system may include that the rechargeable battery is charged by the permanent magnet generator while in generator mode.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of aircraft electric power systems to implement the various technical features described herein are well known. Accordingly, many conventional implementation details are only mentioned briefly herein or are omitted entirely without providing the well-known system and/or process details.

Figure 1:
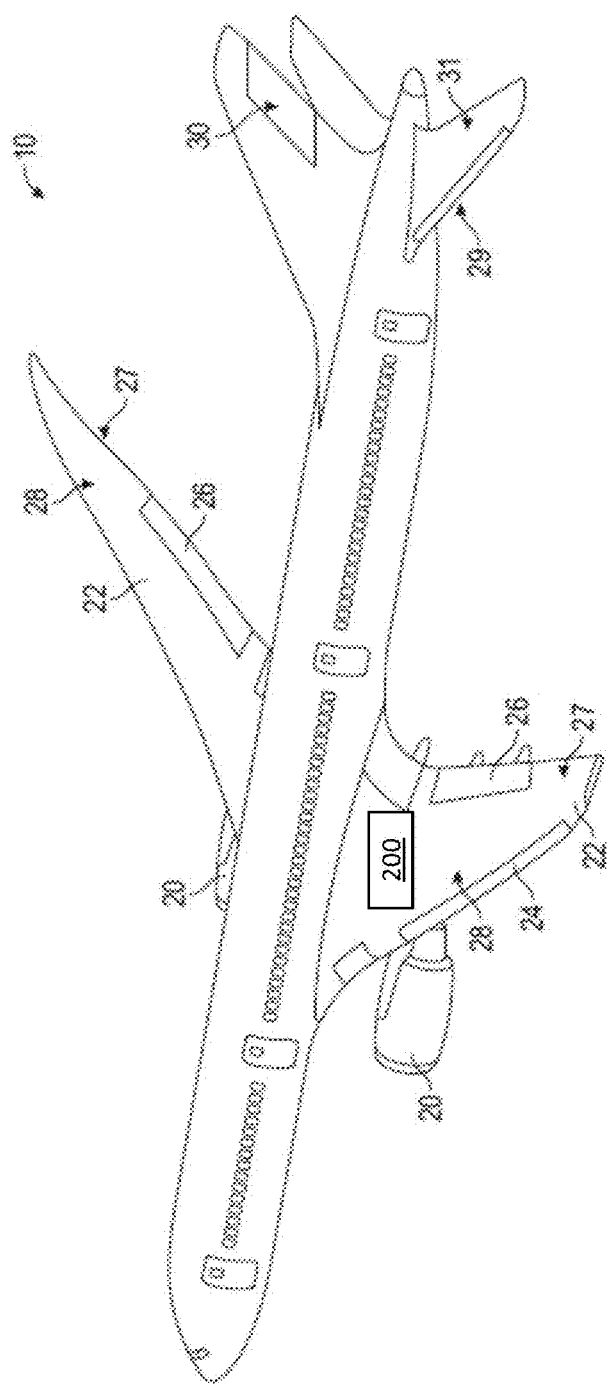
FIG. 1 is a perspective view of an aircraft that may incorporate embodiments of the present disclosure.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together. The aircraft 10 also includes system for parallel excitation of synchronous motor startup 200/300 (described in greater detail in FIGS. 2 and 3) which allows for a startup operation during synchronous motor startup.

Turning now to an overview of technologies that are more specifically relevant to aspects of the disclosure, aspects of the present disclosure provide for a direct current (DC) power source to provide initial DC power to an excitation field winding for a generator connected to an electric motor.

A traditional generator excitation scheme involves a permanent magnet generator (PMG) tied to the generator shaft that is used to create power for the generator exciter field. The PMG is a three-phase wide voltage frequency source whose power is rectified in a generator controller. This rectified voltage is suppled back to the generator exciter field via a control feedback loop in the generator controller which allows for the generator output voltage to be regulated. If the PMG is not rotating or is at a low frequency, the generator excitation is not available as there is not sufficient power to support excitation of the generator.

Aspects of the present disclosure include a generator excitation scheme where the generator and the motor are directly coupled electrically such that the motor frequency is directly proportional to the generator frequency. The generator is connected to a prime mover such that when the prime mover begins to rotate. As the generator input speed increases with the prime mover, the associated generator output frequency will be directly proportional. The generator output frequency will dictate the speed of the motor as they are electrically connected. In order to provide output voltage on the generator, generator excitation is needed before the PMG voltage is available.

For providing generator excitation during the prime mover startup phase, power can be provided from the aircraft DC network and/or rectified AC network to supplement the generator control DC link. Depending on the available DC voltage levels, a boost convertor may be necessary to provide voltage levels similar to what is available when the PMG is at nominal operating speed. This parallel operation will allow for the generator to be excited during startup phases and allow output power to be provide to synchronously start a connected motor.

Figure 2:
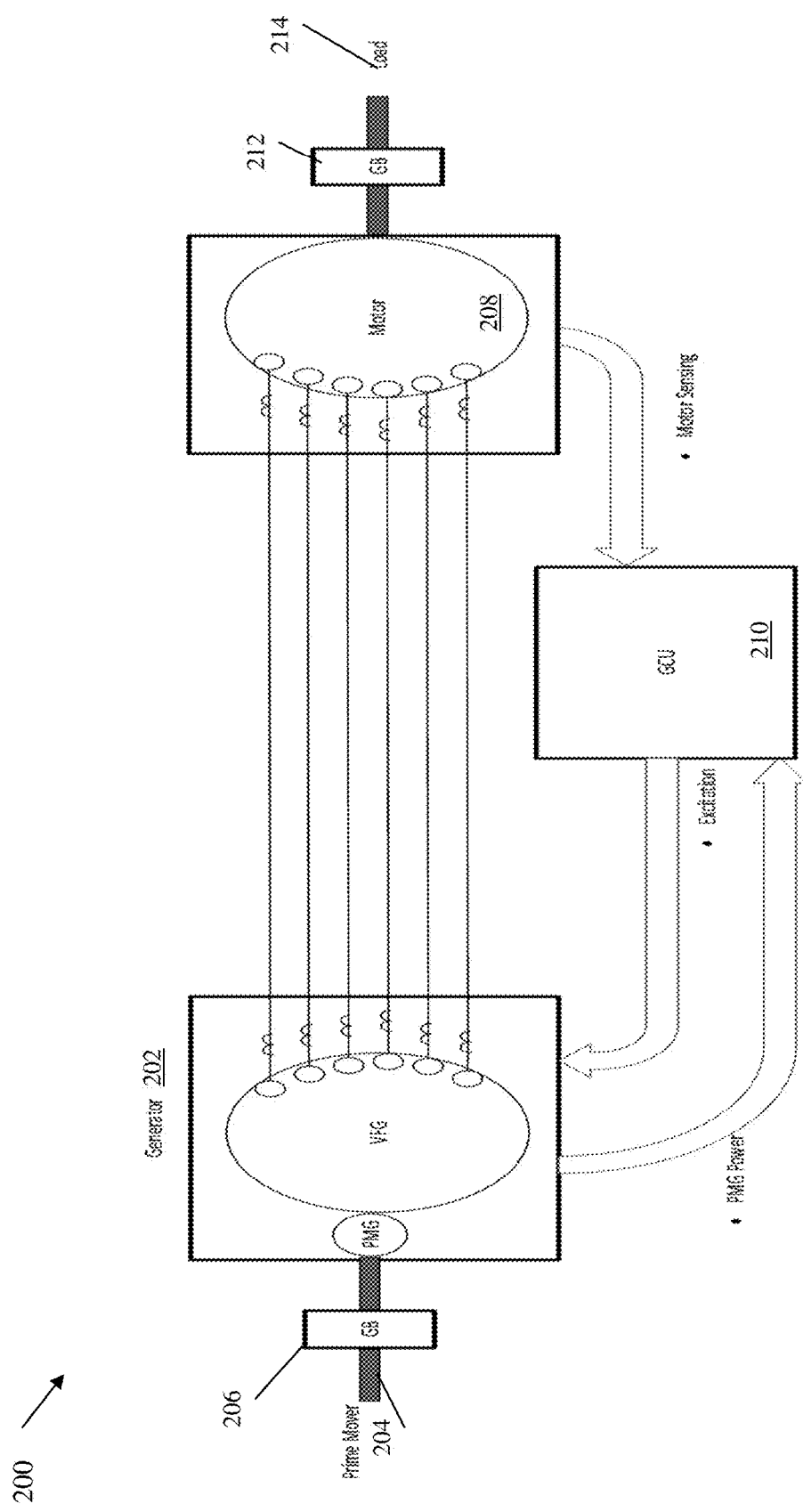
FIG. 2 depicts a block diagram of a system for parallel excitation of synchronous motor startup according to one or more embodiments.

FIG. 2 depicts a block diagram of a system for parallel excitation of synchronous motor startup according to one or more embodiments. The system 200 includes a generator 202 that includes a permanent magnet generator (PMG) with a variable frequency generator. The generator 202 is attached to a prime mover 204 through gear box 206. The generator 202 includes a permanent magnet generator (PMG) and a variable frequency generator (VFG).

The generator 202 is controlled by a generator control unit (GCU) 210 (sometimes referred to as "generator controller") in order to maintain a constant output voltage despite changing electrical loads and gradual increases and decreases in the speed of the generator 202 associated with normal engine operation of an aircraft. The prime mover 204 is driven by the turbine via the gearbox 206. In general, the generator control unit 210 regulates the output voltage of the synchronous generator by controlling an excitation voltage provided to the generator 202. The GCU 210 receives power from the PMG and provides a rectified DC excitation signal to the VFG during start-up and nominal generator operations. The system 200 also includes a synchronous motor 208 which is electrically connected to the generator 202 ("direct drive"). The synchronous motor 208, for example, may drive a mechanical rotor attached to a gear box 212 and load 214. The GCU 210 provides the excitation signal based at least in part on data collected from sensing devices connected to the motor.

Figure 3:
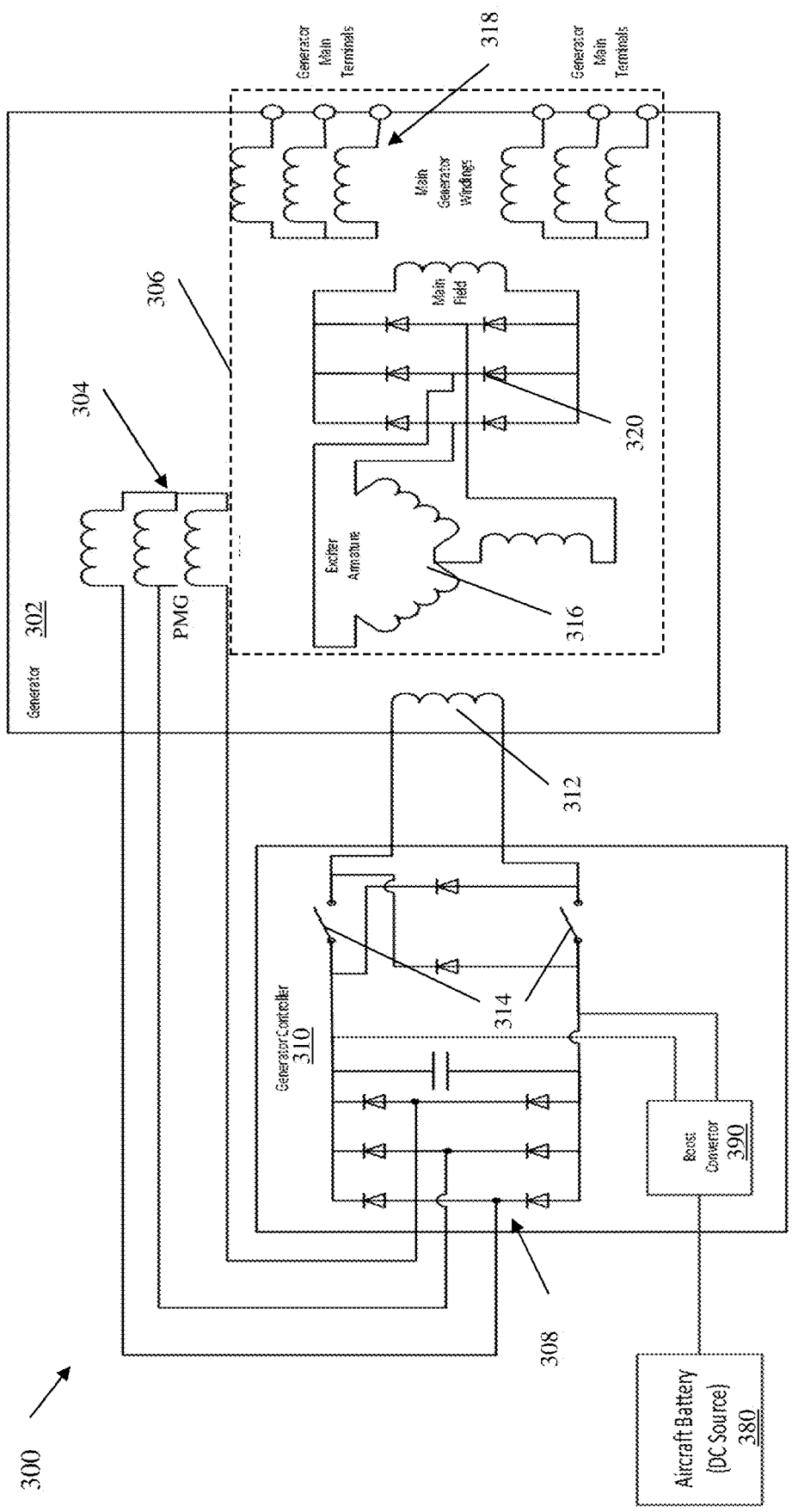
FIG. 3 depicts a diagram of a generator controller with a DC source for a motor according to one or more embodiments.

FIG. 3 depicts a diagram of a generator controller with a DC source for a synchronous motor according to one or more embodiments. The generator controller 310 is connected to a generator 302 that includes a permanent magnet generator (PMG) windings 304 and a main generator 306 (VFG) that includes an exciter armature 316, rectifier circuit 320, main field windings 318, and main generator windings that produce an AC voltage output at the generator main terminals. The main generator 306 and PMG 304 are each connected to receive mechanical energy from a prime mover. In response to mechanical energy provided by the prime mover, PMG 26 generates a 3-phase alternating current (AC) output voltage that is provided to the GCU 310. Circuitry included within GCU 310 rectifies (through a rectifier circuit 308) the 3-phase AC voltage to a direct current (DC) value and then regulates the DC value to a desired magnitude that is provided as an excitation voltage to exciter windings 312. GCU 310 regulates the magnitude of the excitation voltage based on monitoring the output 3-phase AC voltage generated by main generator 306 (as measured at a line contactor or other means) and a voltage set-point. In response to mechanical energy provided by the prime mover and the magnitude of the excitation voltage provided by GCU 310, exciter 312 generates a 3-phase AC output voltage that is provided to rotating rectifier assembly, which rectifies the 3-phase AC voltage and provides the resulting DC voltage as an excitation voltage to main generator 306. GCU 310 therefore monitors the 3-phase AC output voltage generated at the output of the generator and/or at a load (e.g., synchronous motor) and controls the DC excitation voltage provided to exciter 312 such that the rms value of the 3-phase AC output voltage is maintained at a desired value (i.e., the voltage set-point value).

Typically, the generator controller 310 provides excitation to the main generator 306 (VFG) when the initial movement of the prime mover beings powering up the PMG 304. However, as described briefly above, during the start-up phase (startup operational mode) of the prime mover, the PMG 304 may not be able to provide enough power to the generator controller 310 for excitation of the VFG 306 due to the little or low rotational speed of the prime mover. In essence, the prime mover is rotating at a rotational speed below a threshold speed. In one or more embodiments, the system 300 includes an aircraft DC source 380 and a boost converter 390 connected to an output of the rectifier circuit 308 in the generator controller 310. With the addition of the aircraft DC power source 380, a sufficient DC power is provided during startup operations (e.g., when the prime mover is not rotating or rotating at a speed less than a threshold speed). Depending on available DC levels from the aircraft DC source 380, the boost convertor 390 can be utilized to provide voltage levels similar to what is available when the PMG 304 is at nominal operating speed. This parallel operation will allow for the generator 306 to be excited during start-up phases and allow output power to be provided to synchronously start a connected motor. As the rotational speed of the prime mover increases and exceeds a threshold speed, the DC output of the rectification circuit 308 overtakes the DC source 380 and the DC excitation voltage is coming from rectification circuit 308.

In one or more embodiments, the GCU 310 includes a set of diodes and a set of switches between the rectifier circuit 308 and the exciter winding 312. The DC source 380 is connected after a DC link capacitor and before the diodes and switches through the operation boost converter 390. The set of switches are utilized to produce some duty cycle for the DC excitation through the excitation winding 312 so that the field current is constant. The GCU 310 employs a control algorithm to get the PWM frequency using the switches 314. The set of diodes (e.g., flyback diodes) can be utilized to blead off inductance during switching operations by the set of switches. The GCU 310 handles the transition from a startup mode to a generator mode. At some point between the startup mode and generator mode, the rectifier PMG 304 voltage would become higher than the DC source 380 voltage and would take over. The boost converter 390 could further regulate this. In addition, the PMG 304 voltage could be sized such that the DC power source 380 could be charged by excess power provided by the PMG 304. In this situation, the DC power source 380 would be a re-chargeable battery, for example.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a main generator connected to a motor;
   a permanent magnet generator connected to a generator controller, wherein the permanent magnet generator is mechanically connected to a prime mover;
   wherein the generator controller comprises:
      a rectification circuit coupled to an output of the permanent magnet generator; and
      an excitation winding connected to an output of the rectification circuit;
      a direct current (DC) power source connected between an output of the rectification circuit and an input of the excitation winding;
      wherein the generator controller is configured to supply a DC excitation voltage to the excitation winding to regulate the main generator during a plurality of operational modes, wherein the plurality of operational modes comprise a startup mode and a generator mode;
      wherein the DC power source and the rectification circuit are configured to respectively provide a first voltage equal to at least a first portion of the DC excitation voltage and a second voltage equal to at least a second portion of the DC excitation voltage to the excitation windings during the startup mode until the second voltage of the rectification circuit exceeds at least the first voltage provided by the DC power source in the startup mode; and wherein the rectification circuit is configured to provide an entirety of the DC excitation voltage to the excitation windings during the generator mode after the second voltage provided by the rectification circuit exceeded the first voltage provided by the DC power source in the startup mode.

2. The system of claim 1, wherein during the startup mode, the prime mover is rotating below a threshold rotational speed.

3. The system of claim 1, wherein:
   during the generator mode, the prime mover is rotating above a threshold rotational speed; and
   during the generator mode, the second voltage provided by the rectification circuit is equal to the DC excitation voltage.

4. The system of claim 1, wherein the main generator comprises:
   an excitation armature connected to a second rectification circuit;
   a main field winding connected to an output of the second rectification circuit, and main generator windings.

5. The system of claim 1, wherein the generator controller further comprises a set of switches comprising a first switch and a second switch.

6. The system of claim 1, wherein the generator controller further comprises a DC link capacitor connected in parallel at the output of the rectification circuit.

7. The system of claim 1, wherein the motor comprises a synchronous machine.

8. The system of claim 1, wherein the generator controller further comprises a boost converter connected to the DC power source.

9. The system of claim 1, wherein the DC power source comprises a rechargeable battery.

10. The system of claim 9, wherein the rechargeable battery is charged by the permanent magnet generator while in generator mode.

11. A generator control circuit comprising:
    a rectification circuit coupled to an output of a permanent magnet generator; and
    an excitation winding connected to an output of the rectification circuit;
    a direct current (DC) power source connected between an output of the rectification circuit and the excitation winding;
    wherein the generator control circuit is configured to cause the excitation winding to supply an excitation voltage to an excitation armature in a main generator during a during a plurality of operational modes, wherein the plurality of operational modes comprise a startup mode and a generator mode;
    wherein the generator control circuit is configured to cause a first voltage equal to at least a first portion of the DC excitation voltage to be provided to the excitation windings by the DC power source and a second voltage equal to at least a second portion of the DC excitation voltage to be provided to the excitation windings by the rectification circuit during the startup mode until the second voltage of the rectification circuit exceeds at least the first voltage provided by the DC power source in the startup mode; and
    wherein the generator control circuit is configured to cause an entirety of the DC excitation voltage to be provided to the excitation windings by the rectification circuit during the generator mode after the second voltage provided by the rectification circuit exceeded the voltage provided by the DC power source in the startup mode.

12. The generator control circuit of claim 11, wherein the permanent magnet generator is connected to a prime mover.

13. The generator control circuit of claim 12, wherein during the startup mode, the prime mover is rotating below a threshold rotational speed.

14. The generator control circuit of claim 12, wherein:
during the generator mode, the prime mover is rotating above a threshold rotational speed; and
during the generator mode, the second voltage provided by the rectification circuit is equal to the DC excitation voltage.

15. The generator control circuit of claim 11, further comprising a set of switches comprising a first switch and a second switch.

16. The generator control circuit of claim 11, further comprising a DC link capacitor connected in parallel at the output of the rectification circuit.

17. The generator control circuit of claim 11, wherein the main generator is connected to a motor comprising a synchronous machine.

18. The generator control circuit of claim 11, further comprising a boost converter connected to the DC power source.

19. The generator control circuit of claim 11, wherein the DC power source comprises a rechargeable battery.

20. The generator control circuit of claim 19, wherein the rechargeable battery is charged by the permanent magnet generator while in generation mode.

* * * * *